United States Patent
Aoki et al.

(10) Patent No.: US 6,490,371 B1
(45) Date of Patent: Dec. 3, 2002

(54) APPARATUS AND METHOD FOR RESTRUCTURING AND DECODING DIGITAL IMAGE DATA HAVING PLURAL FORMATS

(75) Inventors: Kazuo Aoki, Tokyo (JP); Yoshihito Osawa, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/295,087

(22) Filed: Apr. 20, 1999

(30) Foreign Application Priority Data

Apr. 23, 1998  (JP) ............................................. 10-112974

(51) Int. Cl.[7] ................................................. G06K 9/46
(52) U.S. Cl. .................................. 382/232; 370/395.64
(58) Field of Search ................................... ; G06K 9/46

(56) References Cited

U.S. PATENT DOCUMENTS

| | | | | |
|---|---|---|---|---|
| 5,598,415 A | * | 1/1997 | Nuber et al | 370/474 |
| 5,623,311 A | * | 4/1997 | Phillips et al. | 348/396 |
| 5,703,793 A | * | 12/1997 | Wise et al. | 382/232 |
| 5,835,493 A | * | 11/1998 | Magee et al. | 370/394 |
| 5,874,995 A | * | 2/1999 | Naimpally et al. | 348/384 |
| 6,038,000 A | * | 3/2000 | Hurst, Jr. | 348/845 |

* cited by examiner

Primary Examiner—Jayanti K. Patel
(74) Attorney, Agent, or Firm—Lerner, David, Littenberg, Krumholz & Mentlik, LLP (57) ABSTRACT

A TS parser and a PES parser restructure one ES or a plurality of ESs from a TS packet and a video PID, and a PES packet and a video PID, and output them. The TS parser and the PES parser send the restructured ES(s) to a separate ES buffer. A decoder section reads a certain ES from the separate ES buffer according to an instruction from a control interface section and decodes it in units of frames or fields. A VRAM interface section classifies the image data decoded by the decoder section by program and stores them in a VRAM. An output format selector section selects a certain image data from the image data stored in the VRAM according to an instruction from the control interface section and outputs it.

16 Claims, 8 Drawing Sheets

SD FORMAT

FIG. 3B

HD FORMAT

FIG. 3C

MULTI-SD FORMAT

APPARATUS AND METHOD FOR RESTRUCTURING AND DECODING DIGITAL IMAGE DATA HAVING PLURAL FORMATS

BACKGROUND OF THE INVENTION

1. Field of the Invention

The present invention relates to digital image decoding apparatuses and methods, and providing media, and more particularly, to a digital image decoding apparatus and method, and a providing medium which allow a data stream having a plurality of formats to be input.

2. Description of the Related Art

Figure 8:
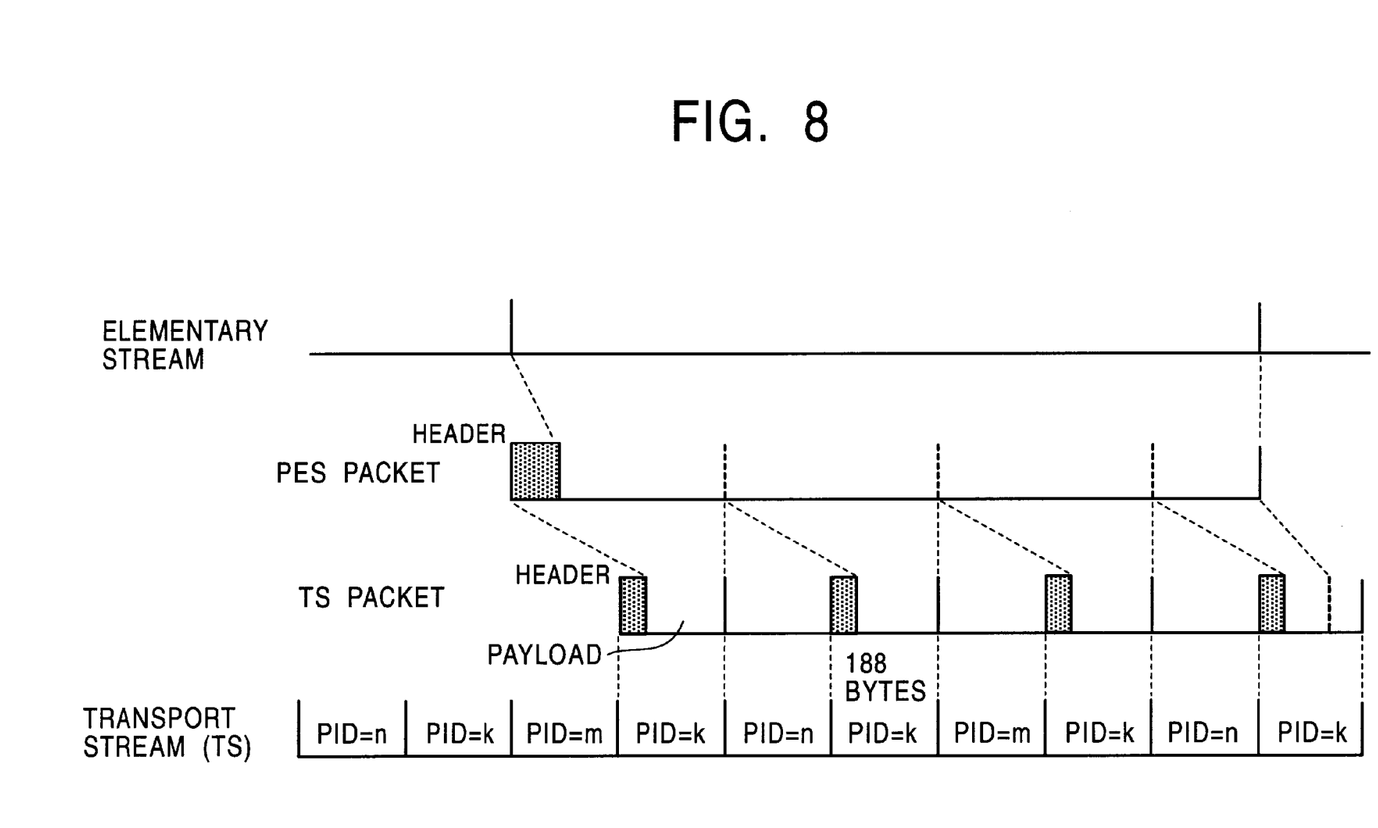
FIG. 8 is a view showing the formats of MPEG2 data streams.

FIG. 8 shows three formats of data streams in the Moving Picture Experts Group 2 (MPEG2). An elementary stream (video data or audio data) is divided into several packetized elementary stream (PES) packets. A PES packet is further divided into several transport stream (TS) packets. A TS packet is formed of a header and a payload. The header includes a packet identifier (PID) serving as the identification information of the TS packet. With the use of a PID, data in a transport stream is identified.

In a conventional digital image decoding apparatus, only the elementary stream can be input-processed among the above three formats.

An elementary stream (ES) can be input to the conventional digital image decoding apparatus, but a transport stream (TS) or a packetized elementary stream (PES) cannot be input as is.

In addition, the conventional digital image decoding apparatus cannot apply input processing to a plurality of ESs.

Furthermore, the conventional digital image decoding apparatus cannot output decoded image data in a format corresponding to a display unit.

SUMMARY OF THE INVENTION

Accordingly, it is an object of the present invention to enable a plurality of ESs and a data stream having a plurality of formats to be input-processed.

The foregoing object is achieved in one aspect of the present invention through the provision of a digital image decoding apparatus including: structure means for restructuring an elementary stream from a data stream having a plurality of formats; first storage means for temporarily storing the elementary stream restructured by the structure means; decoding means for reading and decoding the elementary stream stored in the first storage means as required; second storage means for storing the image data decoded by the decoding means, according to programs; and output selecting means for selecting and outputting the image data stored in the second storage means, according to a display form.

The foregoing object is achieved in another aspect of the present invention through the provision of a digital image decoding method including: a structure step for restructuring an elementary stream from a data stream having a plurality of formats; a first storage step for temporarily storing the elementary stream restructured in the structure step; a decoding step for reading and decoding the elementary stream stored in the first storage step as required; a second storage step for storing the image data decoded in the decoding step, according to programs; and an output selecting step for selecting and outputting the image data stored in the second storage step, according to a display form.

The foregoing object is achieved in yet another aspect of the present invention through the provision of a providing medium for providing a program which has a digital image decoding apparatus execute processing, the processing including: a structure step for restructuring an elementary stream from a data stream having a plurality of formats; a first storage step for temporarily storing the elementary stream restructured in the structure step; a decoding step for reading and decoding the elementary stream stored in the first storage step as required; a second storage step for storing the image data decoded in the decoding step, according to programs; and an output selecting step for selecting and outputting the image data stored in the second storage step, according to a display form.

In a digital image decoding apparatus according to the present invention, structure means restructures an elementary stream from a data stream having a plurality of formats; first storage means temporarily stores the elementary stream restructured by the structure means; decoding means reads and decodes the elementary stream stored in the first storage means as required; second storage means stores the image data decoded by the decoding means, according to programs; and output selecting means selects and outputs the image data stored in the second storage means, according to a display form.

In a digital image decoding method and a providing medium according to the present invention, an elementary stream is restructured from a data stream having a plurality of formats in a structure step; the elementary stream restructured in the structure step is temporarily stored in a first storage step; the elementary stream stored in the first storage step is read and decoded as required in a decoding step; the image data decoded in the decoding step is stored according to programs in a second storage step; and the image data stored in the second storage step is selected and output according to a display form in an output selecting step.

According to the present invention, since a data stream having a plurality of formats can be processed, various connection methods can be available for connecting to a demultiplexer apparatus.

DESCRIPTION OF THE PREFERRED EMBODIMENT

Figure 1:
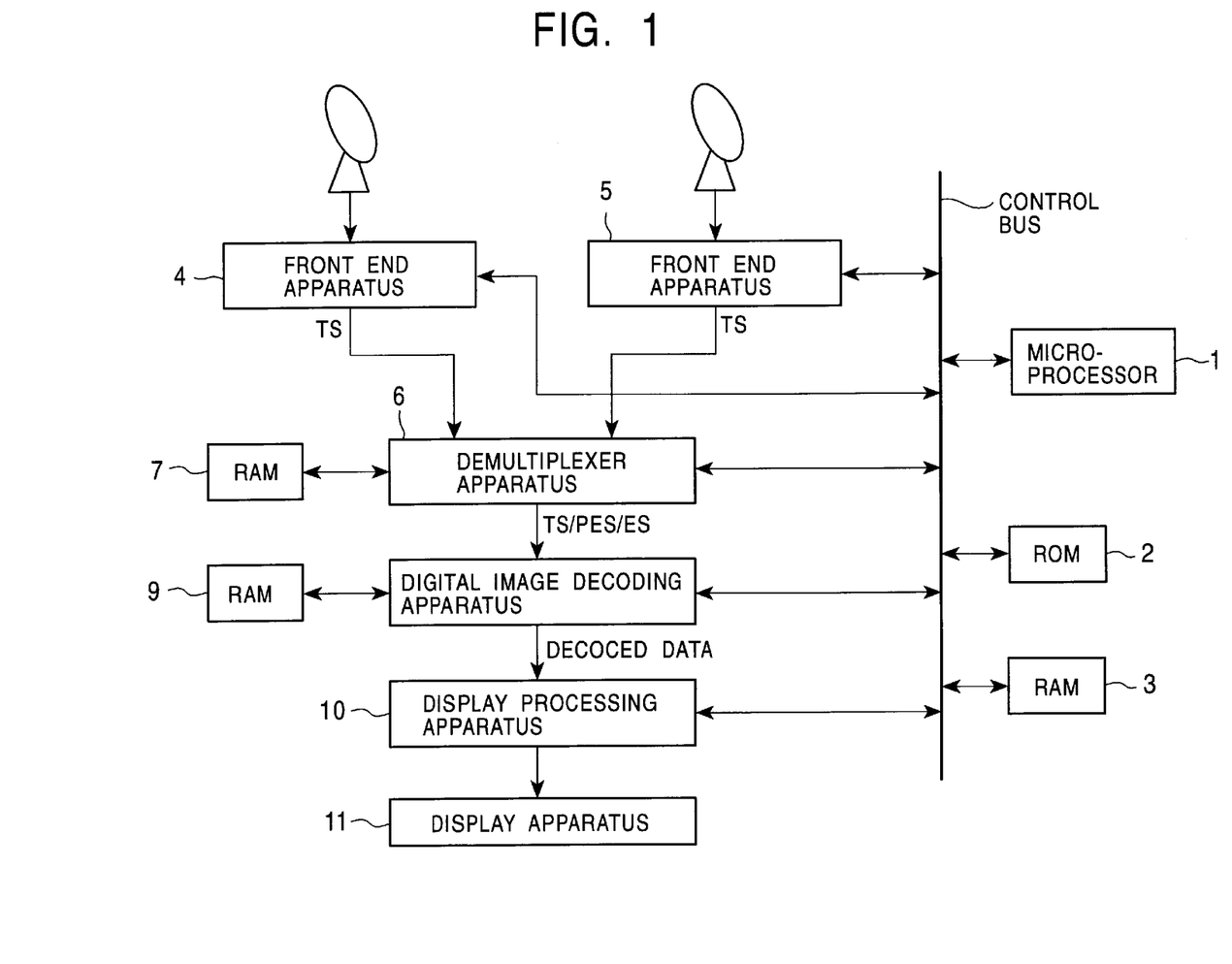
FIG. 1 is a block diagram showing a digital image decoding system according to an embodiment of the present invention.

FIG. 1 is a block diagram showing a structure of a digital image decoding system according to an embodiment of the present invention. A microprocessor 1 controls the system. A ROM 2 stores the program of the microprocessor 1. The microprocessor 1 writes data into and reads data from a RAM 3, as required.

A front end apparatus 4 is formed of a tuner section, a digital demodulating section, and an error correction section not shown. A part of a digital modulated signal received at an antenna is selected by the tuner section according to an instruction from the microprocessor 1. The digital demodulating section demodulates a received digital signal and sends it to the error correction section. The error correction section applies error correction to the sent digital signal and outputs a transport stream (TS). The front end apparatus 5 has the same structure as the front end apparatus 4.

A demultiplexer apparatus 6 separates TS packets and PES packets or an ES from the sent TS and outputs them. The demultiplexer apparatus 6 also outputs PIDs, and writes data into and reads data from a RAM 7 as required.

A digital image decoding apparatus 8 restructures one ES or a plurality of ESs from the TS packets and PES packets, or the ES sent from the demultiplexer apparatus 6, and decodes according to a decoding time stamp. In one embodiment, a decoding start time (DTS) is used as the decoding time stamp. The digital image decoding apparatus 8 writes data into and reads data from a RAM 9 as required. The digital image decoding apparatus 8 outputs image data to a display processing apparatus 10 in the format required by the display processing apparatus 10 according to a presentation time stamp. The one embodiment, a display start time (PTS) is used as the presentation time stamp.

The display processing apparatus 10 converts the format of the received image data according to an instruction from the microprocessor 1, and sends the received image data to a display apparatus 11. The display apparatus 11 displays the received image data.

Figure 2:
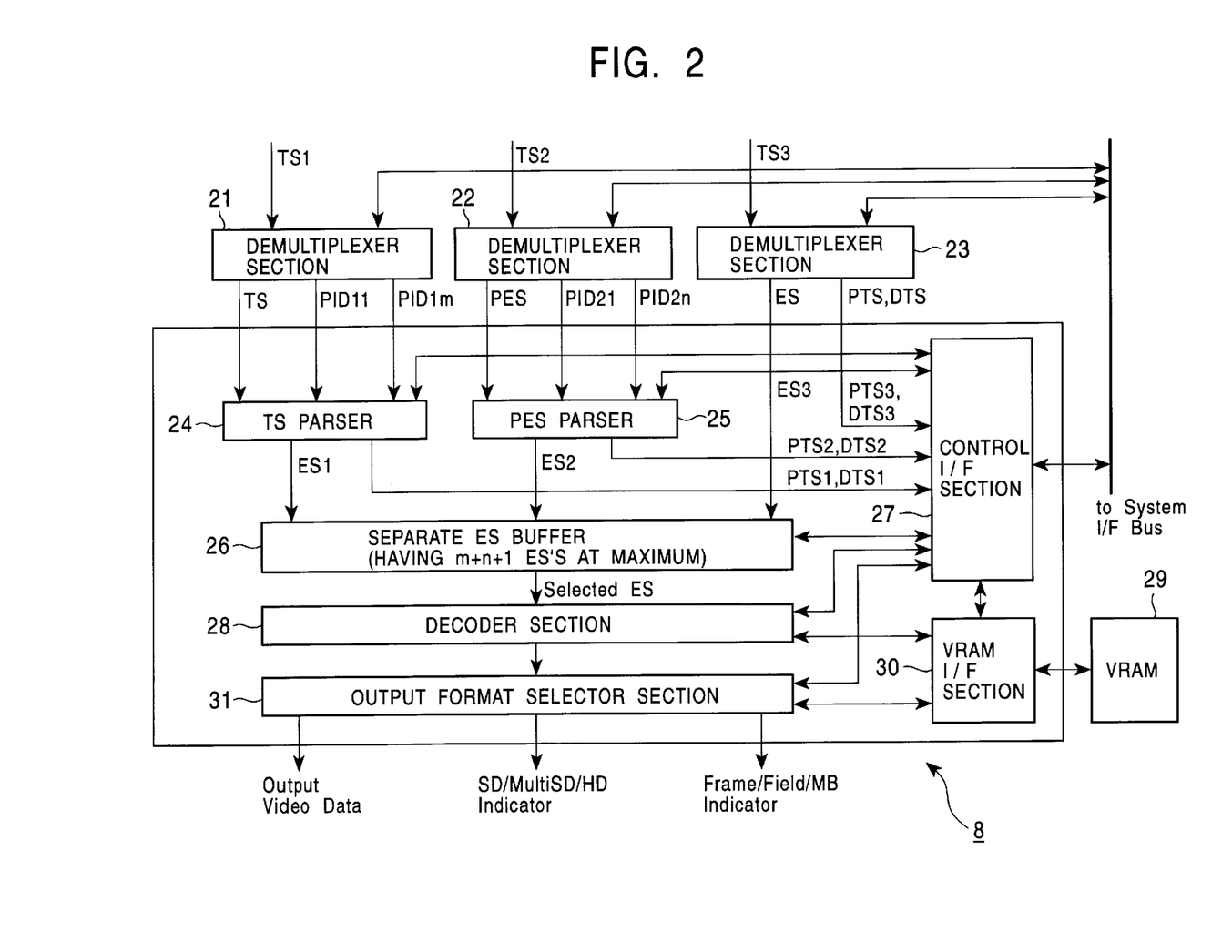
FIG. 2 is a block diagram showing a first configuration example of a digital image decoding apparatus according to the present invention.

FIG. 2 is a block diagram showing a first configuration example of the digital image decoding apparatus 8 according to the present invention. When a TS 1 is input, a demultiplexer section 21 separates TS packets (image data) and one PID or a plurality of PIDs and sends them to a TS parser 24 in the digital image decoding apparatus 8. When a TS 2 is input, a demultiplexer section 22 separates PES packets (image data) and one PID or a plurality of PIDs and sends them to a PES parser 25 in the digital image decoding apparatus 8. When a TS 3 is input, a demultiplexer section 23 separates an ES (image data) and sends it to a separate ES buffer 26 in the digital image decoding apparatus 8, and sends a PTS 3 and a DTS 3 to a control interface (I/F) section 27.

When the TS parser 24 receives the TS packets and the PID(s), the TS parser 24 extracts a certain TS packet with the use of a PID according to an instruction from the control I/F section 27, and restructures one ES or a plurality of ESs from the TS packet and outputs it. The TS parser 24 sends the restructured ES (ES 1) to the separate ES buffer 26 and sends a PTS 1 and a DTS 1 to the control I/F section 27.

When the PES parser 25 receives the PES packets and the PID(s), the PES parser 25 extracts a certain PES packet with the use of a PID according to an instruction from the control I/F section 27, and restructures one ES or a plurality of ESs from the PES packet and outputs it. The PES parser 25 sends the restructured ES (ES 2) to the separate ES buffer 26 and sends a PTS 2 and a DTS 2 to the control I/F section 27.

When the separate ES buffer 26 receives the ESs from the TS parser 24, the PES parser 25, and the demultiplexer section 23, the separate ES buffer 26 classifies the ESs by program (video PID) according to an instruction from the control I/F section 27 and temporarily stores them.

A decoder section 28 reads a certain ES from the separate ES buffer 26 according to an instruction from the control I/F section 27. When the separate ES buffer 26 holds a plurality of ESs, they are read in the ascending order of DTSs. The read ESs are decoded in units of frames or fields.

A VRAM interface (I/F) section 30 classifies the image data decoded by the decoder section 28 by program and stores them in a VRAM 29.

An output format selector section 31 selects a certain image data from the image data stored in the VRAM 29 according to an instruction from the control I/F section 27 and outputs it.

Figure 3A:
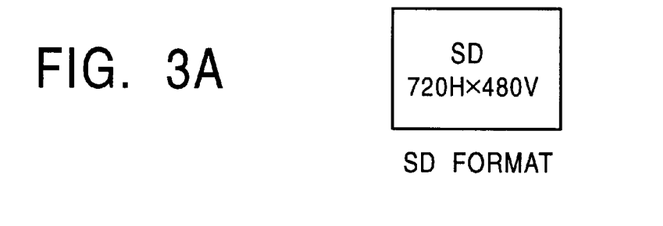
FIGS. 3A to 3C show image display forms.
Figure 3B:
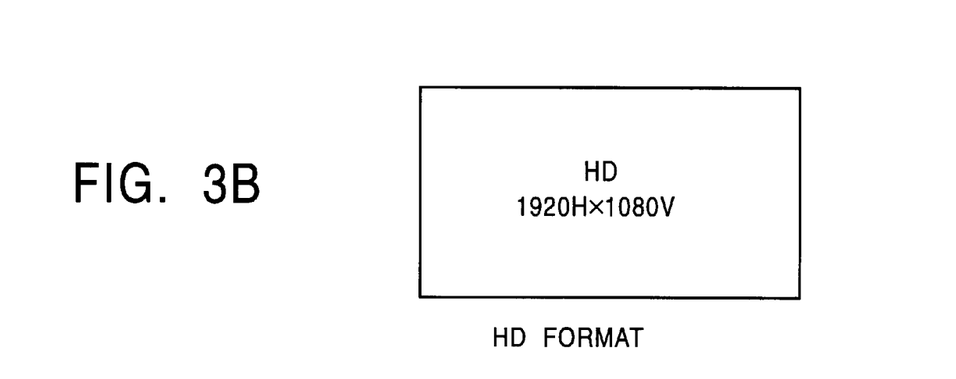
Figure 3C:
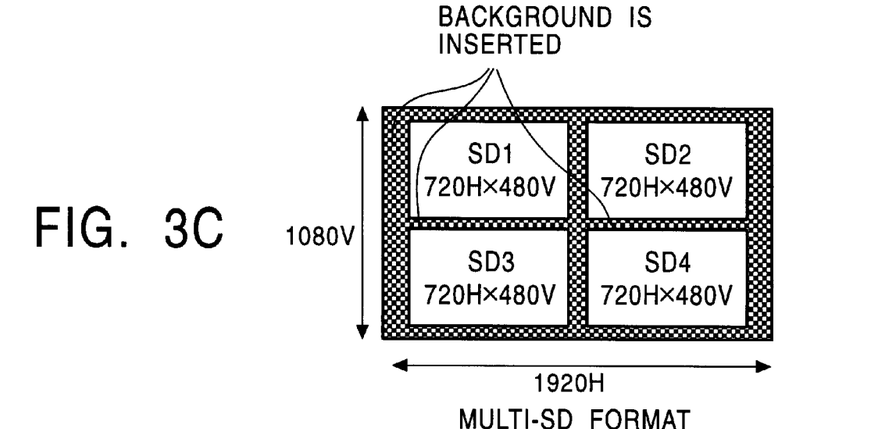

The output format selector section 31 selects one program from the image data stored in the VRAM 29 according to an instruction from the control I/F section 27 and outputs it as one piece of SD image (shown in FIG. 3A) together with an SD identifier. When an HD image (shown in FIG. 3B) is output, it is output together with an HD identifier in the same way as for an SD image. When a plurality of SD programs are output, image data having the same PTS of up to four programs is selected and output as one piece of multi-SD image (shown in FIG. 3C) together with a multi-SD identifier.

The output format selector section 31 also outputs image data in units of frames, fields, or macroblocks (MBs) together with a frame identifier, a field identifier, or a macroblock identifier correspondingly to the display apparatus 11 (shown in FIG. 1).

Figure 4:
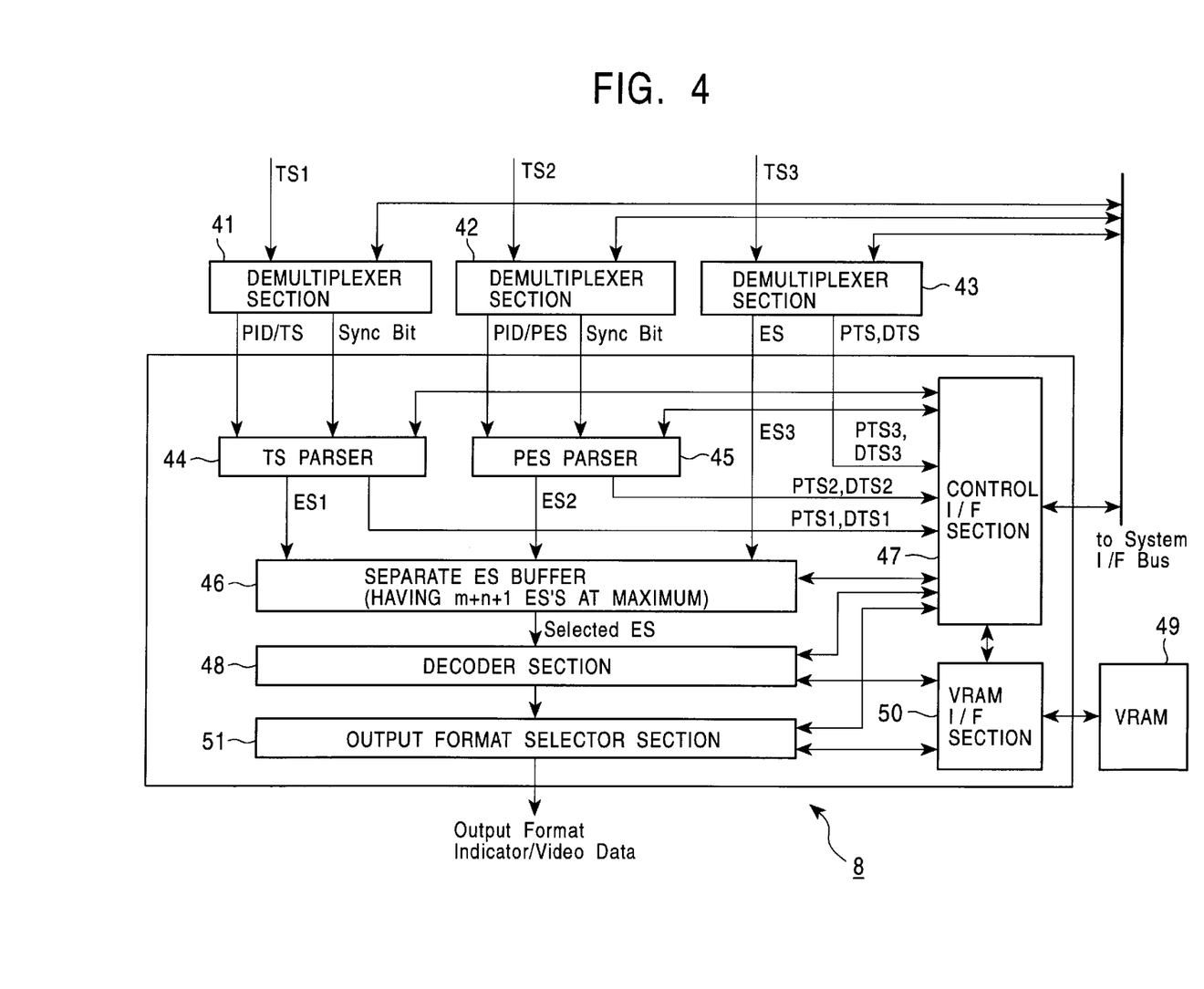
FIG. 4 is a block diagram showing a second configuration example of the digital image decoding apparatus according to the present invention.
Figure 5:
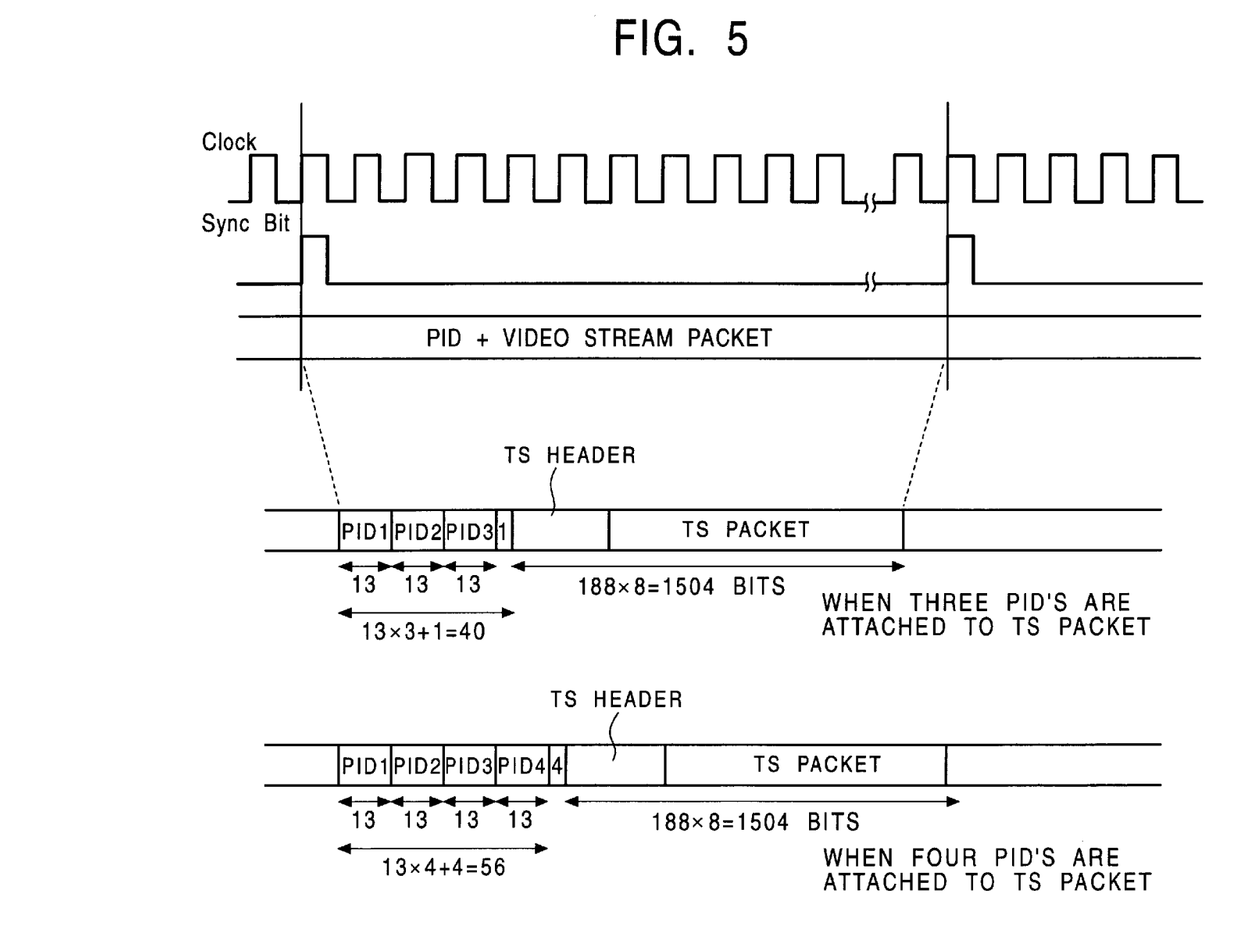
FIG. 5 is a view showing TS packets to which PIDs are attached.

FIG. 4 is a block diagram showing a second configuration example of the digital image decoding apparatus 8 according to the present invention. In the first configuration example, when a TS packet and a PES packet are input, the corresponding PIDs are input separately. In the second configuration example, however, a PID is attached to the top of a TS packet or a PES packet as header information as shown in FIG. 5. FIG. 5 shows a case in which three PIDs are attached at the top of a TS packet and a case in which four PIDs are attached. One TS packet is formed of 188 bytes. Synchronization is maintained by sync bits placed in every eight packets.

Each identifier output together with image data is also attached at the top of the image data of each unit as header information.

When a TS 1 is input, a demultiplexer section 41 separates TS packets (image data) to which a PID(s) is attached as header information and sends them to a TS parser 44. When a TS 2 is input, a demultiplexer section 42 separates PES packets (image data) to which a PID(s) is attached as header information and sends them to a PES parser 45. When a TS 3 is input, a demultiplexer section 43 separates an ES (image data) and sends it to a separate ES buffer 46, and sends a PTS 3 and a DTS 3 to a control interface (I/F) section 47.

When the TS parser 44 receives the TS packets including a PID(s) as header information, the TS parser 44 extracts a certain TS packet according to an instruction from the control I/F section 47, restructures one ES or a plurality of ESs from the TS packet, and outputs it. The TS parser 44 sends the restructured ES (ES 1) to the separate ES buffer 46 and sends a PTS 1 and a DTS 1 to the control I/F section 47.

When the PES parser 45 receives the PES packets including a PID(s) as header information, the PES parser 45 extracts a certain PES packet according to an instruction from the control I/F section 47, restructures one ES or a plurality of ESs from the PES packet, and outputs it. The PES parser 45 sends the restructured ES (ES 2) to the separate ES buffer 46 and sends a PTS 2 and a DTS 2 to the control I/F section 47.

When the separate ES buffer 46 receives the ESs from the TS parser 44, the PES parser 45, and the demultiplexer section 43, the separate ES buffer 46 classifies the ESs by program (video PID) according to an instruction from the control I/F section 47 and temporarily stores them.

A decoder section 48 reads a certain ES from the separate ES buffer 46 according to an instruction from the control I/F section 47. When the separate ES buffer 46 holds a plurality of ESs, they are read in the ascending order of DTSs. The read ESs are decoded in units of frames or fields.

A VRAM interface (I/F) section 50 classifies the image data decoded by the decoder section 48 by program and stores them in a VRAM 49.

An output format selector section 51 selects a certain image data from the image data stored in the VRAM 49 according to an instruction from the control I/F section 47 and outputs it.

Each identifier output together with image data is attached at the top of the image data of each unit as header information.

Figure 6:
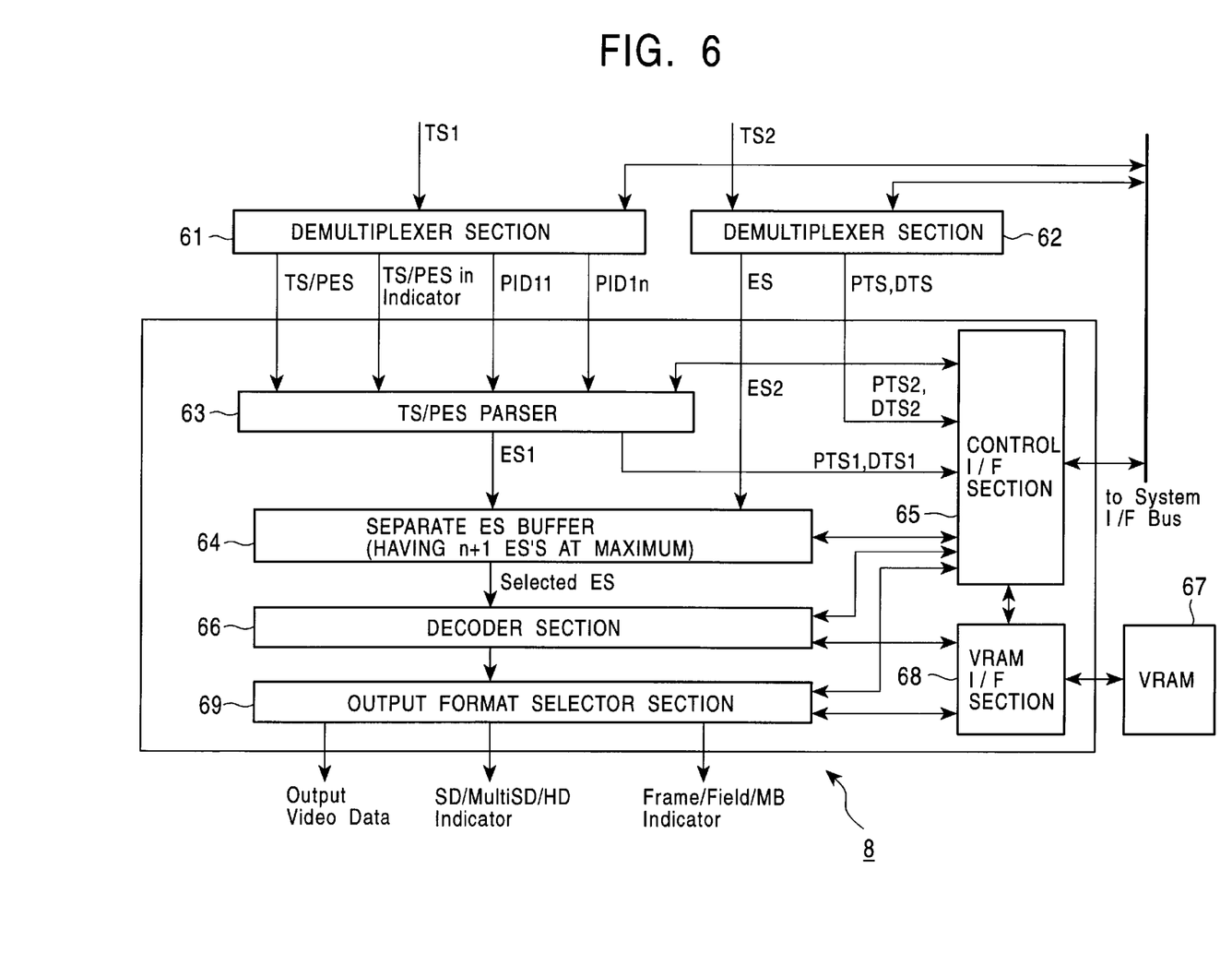
FIG. 6 is a block diagram showing a third configuration example of the digital image decoding apparatus according to the present invention.

FIG. 6 is a block diagram showing a third configuration example of the digital image decoding apparatus 8 according to the present invention. In the first and second configuration examples, ESs are restructured from TS packets and PES packets separately. In the third configuration example, however, separate units for restructure are integrated and the internal circuit of the integrated units is switched according to the identifiers corresponding to TS packets and PES packets.

When a TS 1 is input, a demultiplexer section 61 separates a PID(s) and TS packets or PES packets and sends them to a TS/PES parser 63, and also generates the identifiers corresponding to the TS packets and the PES packets and sends to the TS/PES parser 63. When a TS 2 is input, a demultiplexer section 62 separates an ES (image data), sends it to a separate ES buffer 64, and sends a PTS 2 and a DTS 2 to a control interface (I/F) section 65.

When the TS/PES parser 63 receives the TS packets or PES packets, the TS/PES parser 63 switches the internal circuit according to the identifier, extracts a TS packet or a PES packet according to an instruction from the control I/F section 65, restructures one ES or a plurality of ESs from the TS packet or the PES packet, and outputs it. The TS/PES parser 63 sends the restructured ES (ES 1) to the separate ES buffer 64 and also sends a PTS 1 and a DTS 1 to the control I/F section 65.

When the separate ES buffer 65 receives the ESs from the TS/PES parser 63 and the demultiplexer section 62, the separate ES buffer 64 classifies the ESs by program (video PID) according to an instruction from the control I/F section 65 and temporarily stores them.

A decoder section 66 reads a certain ES from the separate ES buffer 64 according to an instruction from the control I/F section 65. When the separate ES buffer 64 holds a plurality of ESs, they are read in the ascending order of DTSs. The read ESs are decoded in units of frames or fields.

A VRAM interface (I/F) section 68 classifies the image data decoded by the decoder section 66 by program and stores them in a VRAM 67.

An output format selector section 69 selects certain image data from the image data stored in the VRAM 67 according to an instruction from the control I/F section 65 and outputs it.

Figure 7:
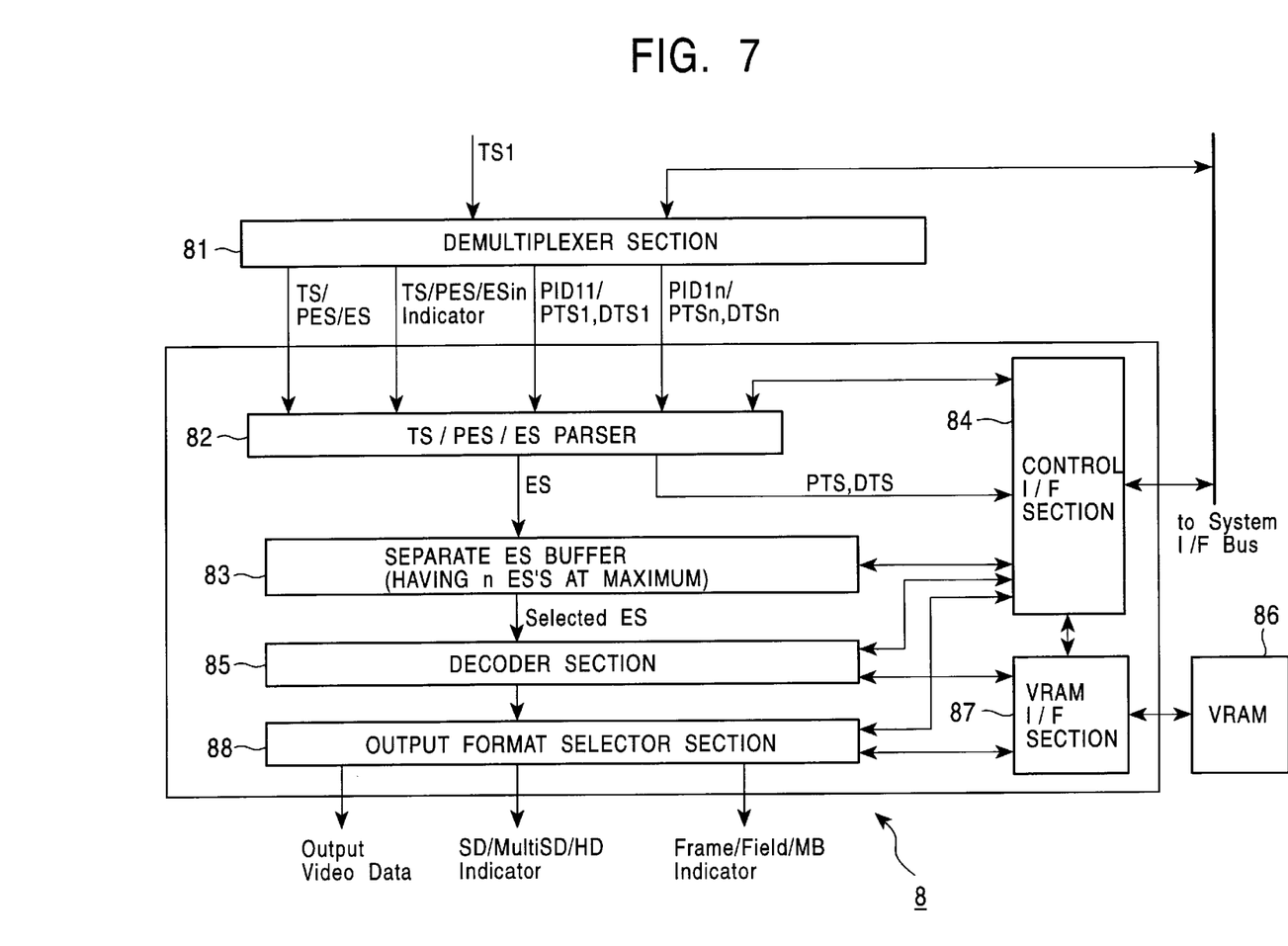
FIG. 7 is a block diagram showing a fourth configuration example of the digital image decoding apparatus according to the present invention.

FIG. 7 is a block diagram showing a fourth configuration example of the digital image decoding apparatus 8 according to the present invention. In the third configuration example, the TS parser and the PES parser are integrated and the internal circuit thereof is switched according to the identifiers corresponding to TS packets and PES packets to restructure an ES from a TS packet or a PES packet. In the fourth configuration example, the TS/PES parser is further integrated with the ES parser.

When a TS 1 is input, a demultiplexer section 81 separates a PID(s), TS packets, PES packets, or ESs and sends them to a TS/PES/ES parser 82, and also generates the identifiers corresponding to the TS packets, the PES packets, and the ESs and sends to the TS/PES/ES parser 82. A demultiplexer 81 also sends PTSs and DTSs to the TS/PES/ES parser 82.

When the TS/PES/ES parser 82 receives the TS packets, the PES packets, or the ESs, the TS/PES/ES parser 82 switches the internal circuit according to the identifier, extracts a TS packet, a PES packet, or an ES according to an instruction from the control I/F section 84, restructures one ES or a plurality of ESs from the TS packet, the PES packet, or the ES and outputs it. The TS/PES/ES parser 82 sends the restructured ES to the separate ES buffer 83 and also sends a PTS and a DTS to the control I/F section 84.

When the separate ES buffer 83 receives the ES(s) from the TS/PES/ES parser 82, the separate ES buffer 83 classifies the ES(s) by program (video PID) according to an instruction from the control I/F section 84 and temporarily stores them.

A decoder section 85 reads a certain ES from the separate ES buffer 83 according to an instruction from the control I/F section 84. When the separate ES buffer 83 holds a plurality of ESs, they are read in the ascending order of DTSs. The read ESs are decoded in units of frames or fields.

A VRAM interface (I/F) section 87 classifies the image data decoded by the decoder section 85 by program and stores them in a VRAM 86.

An output format selector section 88 selects certain image data from the image data stored in the VRAM 86 according to an instruction from the control I/F section 84 and outputs it.

In the present specification, providing media for providing the user with a computer program which executes the above processing include information recording media, such as magnetic disks and CD-ROMs, and network transfer media, such as the Internet and digital satellites.

What is claimed is:

1. A digital image decoding device, comprising:
   a data structuring block having a plurality of inputs each receiving at least one format of a stream of digital image data having a plurality of formats, said data structuring block for restructuring said stream of digital image data to form a restructured elementary stream of data and for outputting said restructured elementary stream;
   a first storage block for storing said restructured elementary stream;
   a decoding block for reading said restructured elementary stream from said first storage device and for decoding said restructured elementary stream to provide decoded image data;
   a second storage block for storing said decoded image data; and
   an output selecting block for selecting from said decoded image data and for outputting said selected image data.

2. A digital image decoding device according to claim 1, wherein said data structuring block forms a plurality of restructured elementary streams of data.

3. A digital image decoding device according to claim 1 wherein said output selecting block outputs said selected image data in units selected from the group consisting of frames, fields, and macroblocks.

4. A digital image decoding device according to claim 1 wherein said output selecting block outputs said selected image data according to a display form.

5. A digital image decoding method, comprising:

receiving, at one of a plurality of inputs, at least one format of a stream of digital image data having a plurality of formats;

restructuring said stream of digital image data to form a restructured elementary stream of data;

storing said restructured elementary stream of data;

reading said restructured elementary stream of data and decoding said restructured elementary stream of data to provide image data;

storing said decoded image data; and selecting from said decoded image data and outputting said selected image data.

6. A digital image decoding method according to claim 5 wherein said selected image data is output according to a display form.

7. A storage medium having instructions for causing a computer to decode digital data, said instructions comprising:

receiving, at one of a plurality of inputs, at least one format of a stream of digital image data having a plurality of formats;

restructuring said stream of digital image data to form a restructured elementary stream of data;

storing said restructured elementary stream of data;

reading said restructured elementary stream of data and decoding said restructured elementary stream of data to provide decoded image data;

storing said decoded image data; and selecting from said decoded image data and output said selected image data.

8. A storage medium according to claim 4 wherein said instructions cause the computer to output said selected image data according to a display form.

9. A digital image decoding device, comprising:

a first input for receiving a packetized elementary stream of data;

a second input for receiving at least one packet identifier;

a data structuring block for restructuring said received packetized elementary stream using said received packet identifier to form a restructured elementary stream of data and for outputting said restructured elementary stream;

a first storage block for storing said restructured elementary stream;

a decoding block for reading said restructured elementary stream from said first storage block and for decoding said restructured elementary stream to provide decoded image data;

a second storage block for storing said decoded image data; and an output selecting block for selecting from said decoded image data and outputting said selected image data.

10. A digital image decoding device according to claim 9 wherein said data structuring block forms a plurality of restructured elementary streams of data.

11. A digital image decoding device according to claim 9 wherein said output selecting block outputs said selected image data according to a display form.

12. A digital image decoding device according to claim 11 wherein said output selecting block outputs said selected image data in units selected from the group consisting of frames, fields and macroblocks.

13. A digital image decoding device, comprising:

a first input for receiving a transport stream;

a second input for receiving at least one packet identifier;

a data structuring block for restructuring said received transport stream using said packet identifier to form a restructured elementary stream of data and for outputting said restructured elementary stream;

a first storage block for storing said restructured elementary stream;

a decoding block for reading said restructured elementary stream from said first storage block and for decoding said restructured elementary stream to provide decoded image data;

a second storage block for storing said decoded image data; and an output selecting block for selecting from said decoded image data and outputting said selected image data.

14. A digital image decoding device according to claim 13 wherein said data structuring block forms a plurality of restructured elementary streams of data.

15. A digital image decoding device according to claim 13 wherein said output selecting block outputs said selected image data according to a display form.

16. A digital image decoding device according to claim 13 wherein said output selecting block outputs said selected image data in units selected from the group consisting of frames, fields, and macroblocks.

* * * * *

UNITED STATES PATENT AND TRADEMARK OFFICE
CERTIFICATE OF CORRECTION

PATENT NO.    : 6,490,371 B1
DATED         : December 3, 2002
INVENTOR(S)   : Kazuo Aoki and Yoshihito Osawa It is certified that error appears in the above-identified patent and that said Letters Patent is hereby corrected as shown below:

<u>Title page,</u>
Item [30], "10-112974" should read -- P10-112974 --.

<u>Column 3,</u>
Line 29, "The" should read -- In --.

<u>Column 7,</u>
Line 44, "4" should read -- 7 --.

Signed and Sealed this

Tenth Day of June, 2003

JAMES E. ROGAN
*Director of the United States Patent and Trademark Office*